(12) United States Patent
Goergen et al.

(10) Patent No.: US 11,200,656 B2
(45) Date of Patent: Dec. 14, 2021

(54) DROP DETECTION SYSTEMS AND METHODS

(71) Applicant: Universal City Studios LLC, Universal City, CA (US)

(72) Inventors: Patrick John Goergen, Orlando, FL (US); Tomas Manuel Trujillo, Orlando, FL (US); Martin Evan Graham, Clermont, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/738,908

(22) Filed: Jan. 9, 2020

(65) Prior Publication Data
US 2020/0225715 A1    Jul. 16, 2020

Related U.S. Application Data

(60) Provisional application No. 62/791,735, filed on Jan. 11, 2019.

(51) Int. Cl.
*G08B 21/00* (2006.01)
*G06T 7/00* (2017.01)
(Continued)

(52) U.S. Cl.
CPC ............ *G06T 7/0002* (2013.01); *G01P 15/18* (2013.01); *G02B 27/0101* (2013.01);
(Continued)

(58) Field of Classification Search
CPC ...... G06F 1/1694; G06F 3/011; G06F 1/1626; G06F 1/1637; G06F 3/14; G01P 15/18;
(Continued)

(56) References Cited

U.S. PATENT DOCUMENTS 6,243,207 B1    6/2001  Kawamura et al.
6,259,565 B1    7/2001  Kawamura et al.
(Continued)

FOREIGN PATENT DOCUMENTS

EP    1643501 B1    6/2013
EP    2834718 B1    10/2018
(Continued)

OTHER PUBLICATIONS

Laerhoven et al., Fair Dice A Tilt and Motion-Aware Cube with a Conscience (Year: 2006).*
(Continued)

*Primary Examiner* — Quang Pham
(74) *Attorney, Agent, or Firm* — Fletcher Yoder, P.C.

(57) ABSTRACT

A detection system is configured to detect improper handling of a wearable visualization device. The detection system includes a sensor coupled to the wearable visualization device, a light emitter coupled to the wearable visualization device, and a processor configured to receive a signal from the sensor. The processor is also configured to determine whether the signal indicates improper handling of the wearable visualization device, and to instruct illumination of the light emitter in response to determining that the signal indicates improper handling of the wearable visualization device.

20 Claims, 5 Drawing Sheets

(51) Int. Cl.
   *H04N 5/225* (2006.01)
   *G06T 5/00* (2006.01)
   *G02B 27/01* (2006.01)
   *G06F 3/14* (2006.01)
   *G01P 15/18* (2013.01)
   *G06F 1/16* (2006.01)
   *G06F 3/01* (2006.01)
   *G06T 19/00* (2011.01)

(52) U.S. Cl.
   CPC ..... *G02B 27/0172* (2013.01); *G02B 27/0176* (2013.01); *G06F 1/1626* (2013.01); *G06F 1/1637* (2013.01); *G06F 1/1694* (2013.01); *G06F 3/011* (2013.01); *G06F 3/14* (2013.01); *G06T 5/006* (2013.01); *G06T 19/006* (2013.01); *H04N 5/2253* (2013.01); *G02B 2027/014* (2013.01); *G02B 2027/0138* (2013.01); *G06T 2207/30168* (2013.01)

(58) Field of Classification Search
   CPC ............ G02B 27/0176; G02B 27/0101; G02B 27/0172; G02B 2027/0138; G02B 2027/014; G06T 7/0002; G06T 5/006; G06T 19/006; G06T 2207/30168; H04N 5/2253
   See application file for complete search history.

(56) References Cited

U.S. PATENT DOCUMENTS

| | | | |
|---|---|---|---|
| 6,384,983 B1 | 5/2002 | Yamazaki et al. | |
| 7,012,756 B2 | 3/2006 | Takagi et al. | |
| 7,019,909 B2 | 3/2006 | Yamazaki et al. | |
| 7,059,182 B1 * | 6/2006 | Ragner | H05K 5/0086 73/200 |
| 7,350,394 B1 | 4/2008 | Flynn et al. | |
| 7,375,645 B2 * | 5/2008 | Tsai | G01L 5/0052 340/665 |
| 7,450,332 B2 | 11/2008 | Pasolini et al. | |
| 7,477,469 B2 * | 1/2009 | Cook | G11B 19/04 360/75 |
| 7,492,544 B2 * | 2/2009 | Jeansonne | G11B 19/042 360/75 |
| 7,495,638 B2 | 2/2009 | Lamvik et al. | |
| 7,549,335 B2 * | 6/2009 | Inoue | G01P 3/22 73/510 |
| 8,025,581 B2 | 9/2011 | Bryan et al. | |
| 8,212,859 B2 | 7/2012 | Tang et al. | |
| 8,330,305 B2 * | 12/2012 | Hart | H04M 1/185 307/650 |
| 8,408,041 B2 * | 4/2013 | Ten Kate | A61B 5/1117 73/12.06 |
| 8,477,425 B2 | 7/2013 | Border et al. | |
| 8,511,827 B2 | 8/2013 | Hua et al. | |
| 8,576,276 B2 | 11/2013 | Bar-Zeev et al. | |
| 8,694,251 B2 * | 4/2014 | Janardhanan | G01C 21/16 701/512 |
| 8,705,177 B1 | 4/2014 | Miao | |
| 8,767,014 B2 | 7/2014 | Vaught et al. | |
| 8,810,482 B2 | 8/2014 | Abdollahi et al. | |
| 8,866,870 B1 | 10/2014 | Smith | |
| 8,867,139 B2 | 10/2014 | Gupta | |
| 8,905,177 B2 * | 12/2014 | Grossman | B62D 59/04 180/198 |
| 8,907,865 B2 | 12/2014 | Miyawaki et al. | |
| 8,941,559 B2 | 1/2015 | Bar-Zeev et al. | |
| 8,964,298 B2 | 2/2015 | Haddick et al. | |
| 9,037,125 B1 * | 5/2015 | Kadous | G06F 3/014 455/418 |
| 9,052,505 B2 | 6/2015 | Cheng et al. | |
| 9,088,787 B1 | 7/2015 | Smith et al. | |
| 9,253,524 B2 | 2/2016 | Kaburlasos et al. | |
| 9,268,138 B2 | 2/2016 | Shimizu et al. | |
| 9,285,871 B2 | 3/2016 | Geisner et al. | |
| 9,286,730 B2 | 3/2016 | Bar-Zeev et al. | |
| 9,292,973 B2 | 3/2016 | Bar-Zeev et al. | |
| 9,310,591 B2 | 4/2016 | Hua et al. | |
| 9,310,610 B2 | 4/2016 | Border | |
| 9,316,834 B2 | 4/2016 | Makino et al. | |
| 9,342,610 B2 | 5/2016 | Liu et al. | |
| 9,354,446 B2 | 5/2016 | Abdollahi et al. | |
| 9,360,671 B1 | 6/2016 | Zhou | |
| 9,366,870 B2 | 6/2016 | Cheng et al. | |
| 9,366,871 B2 | 6/2016 | Ghosh et al. | |
| 9,383,582 B2 | 7/2016 | Tang et al. | |
| 9,389,423 B2 | 7/2016 | Bhardwaj et al. | |
| 9,395,811 B2 | 7/2016 | Vaught et al. | |
| 9,402,568 B2 | 8/2016 | Barfield | |
| 9,451,915 B1 * | 9/2016 | Wong | A61B 5/4803 |
| 9,454,007 B1 | 9/2016 | Smith et al. | |
| 9,454,010 B1 | 9/2016 | Passmore et al. | |
| 9,497,501 B2 | 11/2016 | Mount et al. | |
| 9,519,144 B2 | 12/2016 | Lanman et al. | |
| D776,110 S | 1/2017 | Gribetz et al. | |
| D776,111 S | 1/2017 | Baldassi et al. | |
| 9,569,886 B2 | 2/2017 | Akenine-Moller et al. | |
| 9,576,399 B2 | 2/2017 | Lo et al. | |
| 9,581,819 B1 | 2/2017 | Boggs et al. | |
| 9,582,922 B2 | 2/2017 | Lanman et al. | |
| 9,588,341 B2 | 3/2017 | Bar-Zeev et al. | |
| 9,606,362 B2 | 3/2017 | Passmore et al. | |
| 9,638,836 B1 | 5/2017 | Harrison et al. | |
| 9,638,921 B2 | 5/2017 | Miller et al. | |
| 9,645,396 B2 | 5/2017 | Andes et al. | |
| 9,658,457 B2 | 5/2017 | Osterhout | |
| 9,658,460 B2 | 5/2017 | Lee et al. | |
| 9,667,954 B2 | 5/2017 | Tang | |
| 9,690,371 B2 | 6/2017 | Saito | |
| 9,690,374 B2 | 6/2017 | Clement et al. | |
| 9,690,375 B2 * | 6/2017 | Blum | G06T 19/006 |
| 9,696,552 B1 | 7/2017 | Goergen et al. | |
| 9,715,257 B2 * | 7/2017 | Manullang | H04M 1/185 |
| 9,720,505 B2 | 8/2017 | Gribetz et al. | |
| 9,733,477 B2 | 8/2017 | Gupta | |
| 9,733,480 B2 | 8/2017 | Baek et al. | |
| 9,733,481 B2 | 8/2017 | Carollo et al. | |
| 9,741,125 B2 | 8/2017 | Baruch et al. | |
| 9,763,342 B2 | 9/2017 | Long et al. | |
| 9,773,438 B1 | 9/2017 | Gribetz et al. | |
| 9,778,467 B1 | 10/2017 | White et al. | |
| 9,839,857 B2 * | 12/2017 | Wagner | A63G 7/00 |
| D807,882 S | 1/2018 | Gribetz et al. | |
| 9,864,406 B2 | 1/2018 | Miller et al. | |
| 9,869,862 B2 | 1/2018 | Cheng et al. | |
| 9,874,749 B2 | 1/2018 | Bradski et al. | |
| 9,877,016 B2 | 1/2018 | Esteban et al. | |
| 9,885,871 B2 | 2/2018 | Abdollahi et al. | |
| D812,612 S | 3/2018 | Gribetz et al. | |
| 9,928,661 B1 | 3/2018 | Kinstner et al. | |
| 9,933,624 B1 | 4/2018 | White et al. | |
| 9,939,650 B2 | 4/2018 | Smith et al. | |
| 9,958,951 B1 | 5/2018 | Gribetz | |
| 9,983,697 B1 | 5/2018 | Gribetz | |
| 9,984,505 B2 | 5/2018 | Rimon et al. | |
| 9,984,510 B1 | 5/2018 | Kinstner et al. | |
| 9,990,779 B2 | 6/2018 | Kinstner et al. | |
| 9,990,872 B1 | 6/2018 | Gribetz et al. | |
| 10,026,231 B1 | 7/2018 | Gribetz et al. | |
| 10,026,232 B2 | 7/2018 | Lo et al. | |
| 10,037,629 B2 | 7/2018 | Kinstner et al. | |
| D825,560 S | 8/2018 | Gribetz et al. | |
| D825,561 S | 8/2018 | Gribetz et al. | |
| 10,043,305 B2 | 8/2018 | Lo et al. | |
| 10,057,968 B2 | 8/2018 | Gribetz et al. | |
| D830,359 S | 10/2018 | Gribetz et al. | |
| 10,088,685 B1 | 10/2018 | Aharoni et al. | |
| 10,127,727 B1 | 11/2018 | Yuan et al. | |
| 10,168,768 B1 | 1/2019 | Kinstner | |
| 10,168,789 B1 | 1/2019 | Soto et al. | |
| 10,168,791 B2 | 1/2019 | Gribetz et al. | |
| 10,186,088 B2 | 1/2019 | Kinstner et al. | |

(56) References Cited

U.S. PATENT DOCUMENTS

| | | |
|---|---|---|
| 10,212,517 B1 | 2/2019 | Beltran et al. |
| 10,260,864 B2 | 4/2019 | Edwin et al. |
| 10,306,030 B1* | 5/2019 | Zeng .................. H04M 1/026 |
| 10,685,515 B2* | 6/2020 | Hazebrouck ............ G01S 11/06 |
| 2004/0201484 A1* | 10/2004 | Cox ..................... G01P 15/18 |
| | | 340/604 |
| 2005/0279165 A1* | 12/2005 | Yuasa ................. G01P 1/127 |
| | | 73/489 |
| 2006/0072206 A1 | 4/2006 | Tsuyuki et al. |
| 2006/0250322 A1 | 11/2006 | Hall et al. |
| 2007/0030159 A1* | 2/2007 | Stoev ................... G11B 19/04 |
| | | 340/669 |
| 2010/0172052 A1* | 7/2010 | Shibata ................... G11B 5/54 |
| | | 360/97.12 |
| 2010/0319434 A1* | 12/2010 | Weber ................ G01P 15/0891 |
| | | 73/12.06 |
| 2011/0149431 A1* | 6/2011 | Shibata ............... G11B 19/043 |
| | | 360/75 |
| 2012/0188149 A1* | 7/2012 | Yamada ............. G02B 27/017 |
| | | 345/8 |
| 2012/0232823 A1* | 9/2012 | Baggen ................... G01P 7/00 |
| | | 702/104 |
| 2012/0320100 A1 | 12/2012 | Machida et al. |
| 2013/0137076 A1 | 5/2013 | Perez et al. |
| 2013/0141419 A1 | 6/2013 | Mount et al. |
| 2013/0197856 A1* | 8/2013 | Barfield ................. G01P 15/18 |
| | | 702/141 |
| 2013/0218058 A1* | 8/2013 | Ceoldo ................... A61H 23/00 |
| | | 601/46 |
| 2013/0245986 A1* | 9/2013 | Grokop ............. H04M 1/72454 |
| | | 702/141 |
| 2013/0278631 A1* | 10/2013 | Border ..................... G02C 5/143 |
| | | 345/633 |
| 2013/0300636 A1* | 11/2013 | Cunningham ........... G06F 3/013 |
| | | 345/8 |
| 2014/0118829 A1 | 5/2014 | Ma et al. |
| 2014/0146394 A1 | 5/2014 | Tout et al. |
| 2014/0168264 A1 | 6/2014 | Harrison et al. |
| 2014/0188426 A1* | 7/2014 | Fastert ................. G08B 25/016 |
| | | 702/139 |
| 2014/0253284 A1* | 9/2014 | Peterson .............. H04B 1/3888 |
| | | 340/3.1 |
| 2014/0364208 A1 | 12/2014 | Perry |
| 2014/0364209 A1 | 12/2014 | Perry |
| 2015/0003819 A1 | 1/2015 | Ackerman et al. |
| 2015/0103152 A1 | 4/2015 | Qin |
| 2015/0301565 A1* | 10/2015 | Manullang ............ G06F 1/1637 |
| | | 361/679.26 |
| 2015/0312561 A1 | 10/2015 | Hoof et al. |
| 2016/0011341 A1 | 1/2016 | Smith |
| 2016/0048203 A1 | 2/2016 | Blum et al. |
| 2016/0062454 A1 | 3/2016 | Wang et al. |
| 2016/0093230 A1 | 3/2016 | Boggs et al. |
| 2016/0097929 A1 | 4/2016 | Yee et al. |
| 2016/0097930 A1 | 4/2016 | Robbins et al. |
| 2016/0098095 A1 | 4/2016 | Gonzalez-Banos et al. |
| 2016/0109710 A1 | 4/2016 | Smith et al. |
| 2016/0154439 A1* | 6/2016 | Rothkopf ............... G06F 1/1656 |
| | | 340/3.1 |
| 2016/0171779 A1 | 6/2016 | Bar-Zeev et al. |
| 2016/0188943 A1 | 6/2016 | Franz |
| 2016/0210784 A1 | 7/2016 | Ramsby et al. |
| 2016/0240013 A1 | 8/2016 | Spitzer |
| 2016/0346704 A1 | 12/2016 | Wagner |
| 2016/0353089 A1 | 12/2016 | Gallup et al. |
| 2016/0364907 A1 | 12/2016 | Schoenberg |
| 2016/0370855 A1 | 12/2016 | Lanier et al. |
| 2016/0377869 A1 | 12/2016 | Lee et al. |
| 2016/0379417 A1 | 12/2016 | Mount et al. |
| 2017/0053445 A1 | 2/2017 | Chen et al. |
| 2017/0053446 A1 | 2/2017 | Chen et al. |
| 2017/0053447 A1 | 2/2017 | Chen et al. |
| 2017/0059831 A1 | 3/2017 | Hua et al. |
| 2017/0108696 A1 | 4/2017 | Harrison et al. |
| 2017/0116950 A1 | 4/2017 | Onal |
| 2017/0131581 A1 | 5/2017 | Pletenetskyy |
| 2017/0158118 A1* | 6/2017 | Lenker ....................... B62J 3/00 |
| 2017/0171538 A1 | 6/2017 | Bell et al. |
| 2017/0176747 A1 | 6/2017 | Vallius et al. |
| 2017/0178408 A1 | 6/2017 | Bavor, Jr. et al. |
| 2017/0188021 A1 | 6/2017 | Lo et al. |
| 2017/0193679 A1 | 7/2017 | Wu et al. |
| 2017/0206713 A1 | 7/2017 | Lo et al. |
| 2017/0208318 A1 | 7/2017 | Passmore et al. |
| 2017/0212717 A1 | 7/2017 | Zhang |
| 2017/0220134 A1 | 8/2017 | Burns |
| 2017/0221264 A1 | 8/2017 | Perry |
| 2017/0236320 A1 | 8/2017 | Gribetz et al. |
| 2017/0236332 A1 | 8/2017 | Kipman et al. |
| 2017/0237789 A1 | 8/2017 | Harner et al. |
| 2017/0242249 A1 | 8/2017 | Wall et al. |
| 2017/0255011 A1 | 9/2017 | Son et al. |
| 2017/0262046 A1 | 9/2017 | Clement et al. |
| 2017/0262047 A1 | 9/2017 | Saito |
| 2017/0270464 A1* | 9/2017 | Morgenthau ............ H04W 4/80 |
| 2017/0270841 A1 | 9/2017 | An et al. |
| 2017/0277256 A1 | 9/2017 | Burns et al. |
| 2017/0285344 A1 | 10/2017 | Benko et al. |
| 2017/0293144 A1 | 10/2017 | Cakmakci et al. |
| 2017/0305083 A1 | 10/2017 | Smith et al. |
| 2017/0316607 A1 | 11/2017 | Khalid et al. |
| 2017/0323416 A1 | 11/2017 | Finnila |
| 2017/0323482 A1* | 11/2017 | Coup ..................... G06T 19/006 |
| 2017/0336863 A1 | 11/2017 | Tilton et al. |
| 2017/0337737 A1 | 11/2017 | Edwards et al. |
| 2017/0345198 A1 | 11/2017 | Magpuri et al. |
| 2017/0352226 A1 | 12/2017 | Matsuzawa et al. |
| 2017/0363872 A1 | 12/2017 | Border et al. |
| 2017/0363949 A1 | 12/2017 | Valente et al. |
| 2017/0364145 A1 | 12/2017 | Blum et al. |
| 2018/0000385 A1 | 1/2018 | Heaton et al. |
| 2018/0003962 A1 | 1/2018 | Urey et al. |
| 2018/0018515 A1 | 1/2018 | Spizhevoy et al. |
| 2018/0024370 A1 | 1/2018 | Carollo et al. |
| 2018/0032101 A1 | 2/2018 | Jiang |
| 2018/0033199 A9 | 2/2018 | Eatedali et al. |
| 2018/0054502 A1* | 2/2018 | Wilson ................... G06F 1/1633 |
| 2018/0059715 A1 | 3/2018 | Chen et al. |
| 2018/0059776 A1 | 3/2018 | Jiang et al. |
| 2018/0095498 A1 | 4/2018 | Raffle et al. |
| 2018/0104601 A1 | 4/2018 | Wagner |
| 2018/0126116 A1* | 5/2018 | White ..................... G02F 1/1334 |
| 2018/0164594 A1 | 6/2018 | Lee et al. |
| 2018/0196262 A1 | 7/2018 | Cage |
| 2018/0203240 A1 | 7/2018 | Jones et al. |
| 2018/0263534 A1* | 9/2018 | Lee ......................... G08B 21/043 |
| 2018/0293041 A1 | 10/2018 | Harviainen |
| 2018/0367952 A1* | 12/2018 | Devdas ................. G08B 21/0446 |
| 2019/0094554 A1 | 3/2019 | Benesh et al. |
| 2019/0318706 A1 | 10/2019 | Peng et al. |
| 2019/0324280 A1* | 10/2019 | Yildiz .................... A61B 5/6831 |
| 2019/0357618 A1* | 11/2019 | Zheng .................. G08B 21/043 |
| 2020/0162844 A1* | 5/2020 | Itoh ........................ H04B 1/385 |
| 2020/0174558 A1* | 6/2020 | Gui ........................ H02J 7/0063 |

FOREIGN PATENT DOCUMENTS

| | | |
|---|---|---|
| GB | 2562758 A | 11/2018 |
| JP | 2012141461 A | 7/2012 |
| JP | 5790187 B2 | 10/2015 |
| JP | 5801401 B2 | 10/2015 |
| JP | 2015228050 A | 12/2015 |
| JP | 5913346 B2 | 4/2016 |
| JP | 2016528942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| KR | 100630762 B1 | 9/2006 |

(56) References Cited

FOREIGN PATENT DOCUMENTS

| WO | WO-2008044569 A1 | 4/2008 |
|----|------------------|--------|
| WO | WO-2014106041 A1 | 7/2014 |
| WO | WO-2018213727 A1 | 11/2018 |

OTHER PUBLICATIONS

Schweiger et al., Throwing Event Detection using Acceleration Magnitude collected with Wrist-Worn Sensors (Year: 2020).*
Yatani et al., Information Transfer Techniques for Mobile Devices y Toss & Swing Actions (Year: 2004).*
U.S. Appl. No. 16/738,906, filed Jan. 9, 2020, Patrick John Goergen.
U.S. Appl. No. 16/738,917, filed Jan. 9, 2020, Douglas Evan Goodner.
U.S. Appl. No. 16/738,788, filed Jan. 9, 2020, Andrew Brian Raij.
PCT/US2020/013163 International Search Report and Written Opinion dated Apr. 17, 2020.

* cited by examiner

DROP DETECTION SYSTEMS AND METHODS

CROSS-REFERENCE TO RELATED APPLICATION

This application claims priority to and the benefit of U.S. Provisional Application No. 62/791,735, entitled "AUGMENTED REALITY (AR) HEADSET FOR HIGH THROUGHPUT ATTRACTIONS," filed Jan. 11, 2019, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and/or theme parks are designed to provide entertainment to guests. Areas of the amusement park may have different themes that are specifically targeted to certain audiences. For example, some areas may include themes that are traditionally of interest to children, while other areas may include themes that are traditionally of interest to more mature audiences. Generally, such areas having themes may be referred to as an attraction or a themed attraction. It is recognized that it may be desirable to enhance the immersive experience for guests in such attractions, such as by augmenting the themes with virtual features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a detection system is configured to detect improper handling of a wearable visualization device. The detection system includes a sensor coupled to the wearable visualization device, a light emitter coupled to the wearable visualization device, and a processor configured to receive a signal from the sensor. The processor is also configured to determine whether the signal indicates improper handling of the wearable visualization device, and to instruct illumination of the light emitter in response to determining that the signal indicates improper handling of the wearable visualization device.

In one embodiment, a wearable visualization device includes a housing, a sensor supported by the housing and configured to detect a motion of the wearable visualization device, a light emitter supported by the housing, and a processor configured to receive a signal from the sensor, determine whether the signal indicates that the wearable visualization device has been dropped or thrown based on a detected motion of the wearable visualization device, and instruct illumination of the light emitter in response to determining that the signal indicates that the wearable visualization device has been dropped.

In one embodiment, a method of using a detection system to detect improper handling of a wearable visualization device includes receiving, at a processor, a signal from a sensor coupled to the wearable visualization device. The method also includes determining, using the processor, that the signal indicates improper handling of the wearable visualization device. The method further includes counting, using the processor, a number of events of improper handling of the wearable visualization device over time. The method further includes instructing, using the processor, illumination of a light emitter in response to determining that the number of events exceeds a count threshold.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
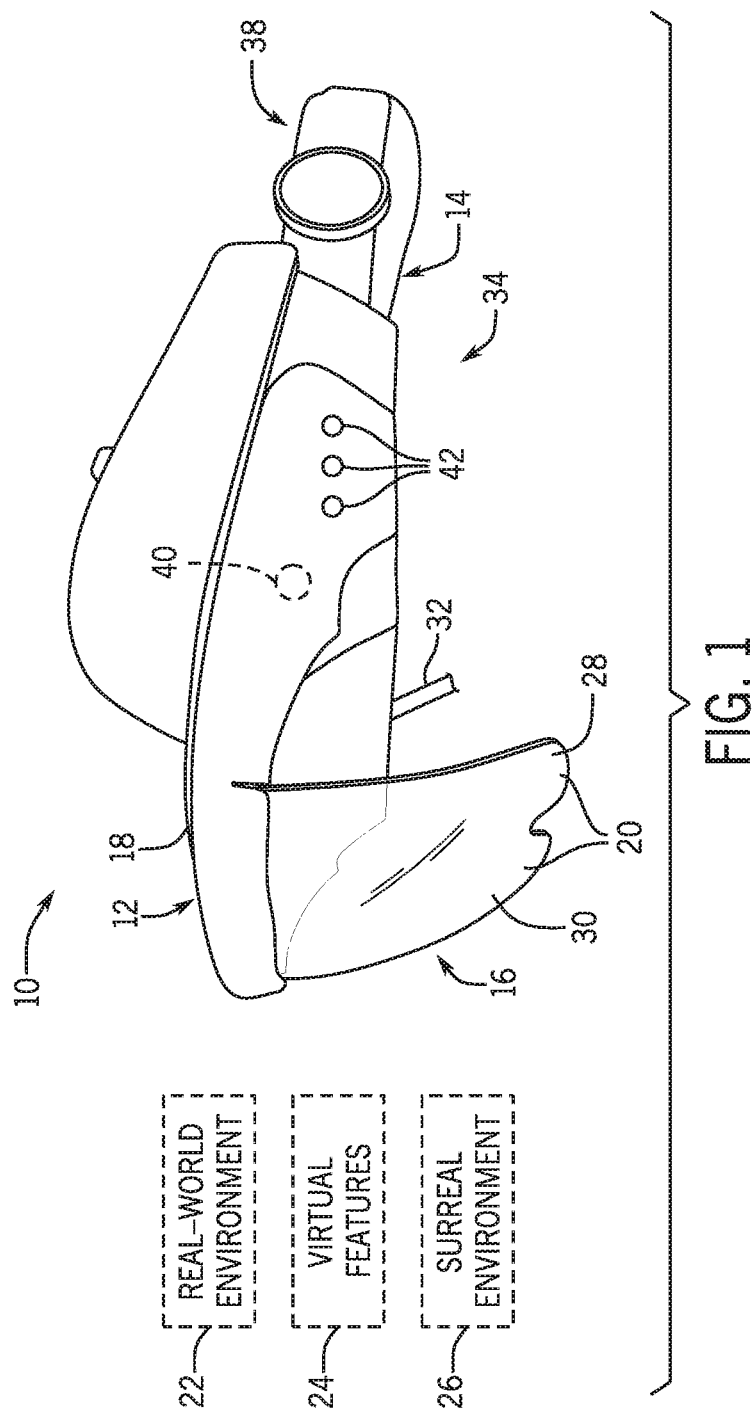
FIG. 1 is a perspective view of a wearable visualization device and an interface device of an augmented reality (AR), virtual reality (VR), and/or mixed reality (a combination of AR and VR) system (AR/VR system) in an engaged configuration, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (a combination of AR and VR) system (e.g., AR/VR system) that is configured to enhance a guest experience of an amusement park attraction by providing guests with AR/VR experiences (e.g., AR experiences, VR experiences, or both). Indeed, combinations of certain hardware configurations, software configurations (e.g., algorithmic structures and/or modeled responses), as well as certain attraction features may be utilized to provide guests with AR/VR experiences that may be customizable, personalized, and/or interactive. For example, the AR/VR system may include a wearable visualization device, such as a head mounted display (e.g., electronic goggles or displays, eyeglasses), which may be worn by a guest and may be configured to enable the guest to view virtual features. In particular, the wearable visualization device may be utilized to enhance a guest experience by overlaying virtual features onto a real-world environment of the amusement park, by providing adjustable virtual environments to provide different experiences in an attraction, and so forth.

Advantageously, the disclosed embodiments provide a detection system (e.g., drop detection system) that is configured to monitor whether the wearable visualization device has been improperly handled (e.g., experienced an adverse or potentially damaging event, such as a drop or a throw). In particular, the detection system may include a sensor (e.g., inertial measurement unit [IMU]) that is coupled to the wearable visualization device and that is configured to monitor one or more parameters (e.g., accelerations and/or decelerations) indicative of the wearable visualization device being improperly handled. The sensor may provide signals indicative of the parameters to a controller (e.g., electronic controller), which may process the signals to determine whether the wearable visualization device has been improperly handled and may cause one or more actions in response to the determination that the wearable visualization device has been improperly handled. For example, the controller may cause illumination of lights (e.g., light emitters; light emitting diodes [LEDs]) on the wearable visualization device, on a ride vehicle of the attraction, at an operator station of the attraction, or otherwise provide a notification that the wearable visualization device has been improperly handled. In some embodiments, the controller may count a number of times that the wearable visualization device has been improperly handled (e.g., a number of times that an acceleration of the wearable visualization device has exceeded an acceleration threshold, as indicated by the signals from the sensor) over time, and the controller may cause the one or more actions in response to the number of times that the wearable visualization device has been improperly handled exceeding a count threshold. Thus, the detection system may facilitate efficient removal of any wearable visualization device that may be damaged due to being improperly handled and may facilitate operation of the AR/VR system so that the guests are able to experience the attraction with functioning wearable visualization devices.

With the foregoing in mind, FIG. 1 is a perspective view an embodiment of an AR/VR system 10 (e.g., a wearable visualization system) configured to enable a user (e.g., a guest, an amusement park employee, an operator of an attraction, a passenger of a ride vehicle) to experience (e.g., view, interact with) AR/VR scenes. As shown, the AR/VR system 10 includes a wearable visualization device 12 (e.g., a head mounted display) and a guest interface device 14 that may be removably coupleable to one another to facilitate usage of the AR/VR system 10.

In the illustrated embodiment, the wearable visualization device 12 includes a lens portion 16 that is coupled to a housing 18 of the wearable visualization device 12. The lens portion 16 may include one or more lenses 20 (e.g., displays; transparent, semi-transparent, or opaque). In some embodiments, the lenses 20 may enable the user to view a real-world environment 22 (e.g., physical structures in the attraction) through the lenses 20 with certain virtual features 24 (e.g., AR features) overlaid onto the lenses 20 so that the user perceives the virtual features 24 as being integrated into the real-world environment 22. That is, the lens portion 16 may at least partially control a view of the user by overlaying the virtual features 24 onto a line of sight of the user. To this end, the wearable visualization device 12 may enable the user to visualize and perceive a surreal environment 26 (e.g., a game environment) having certain virtual features 24 overlaid onto the real-world environment 22 viewable by the user through the lenses 20.

By way of non-limiting example, the lenses 20 may include transparent (e.g., see-through) light emitting diode (LED) displays or transparent (e.g., see-through) organic light emitting diode (OLED) displays. In some embodiments, the lens portion 16 may be formed from a single-piece construction that spans a certain distance so as to display images to both eyes of the user. That is, in such embodiments, the lenses 20 (e.g., a first lens 28, a second lens 30) may be formed from a single, continuous piece of material, where the first lens 28 may be aligned with a first eye of the user and the second lens 30 may be aligned with a second eye of the user. In other embodiments, the lens portion 16 may be a multi-piece construction that is formed from two or more separate lenses 20.

In some embodiments, the wearable visualization device 12 may completely control the view of the user (e.g., using opaque viewing surfaces). That is, the lenses 20 may include opaque or non-transparent displays configured to display virtual features 24 (e.g., VR features) to the user. As such, the surreal environment 26 viewable by the user may be, for example, a real-time video that includes real-world images of the real-world environment 22 electronically merged with one or more virtual features 24. Thus, in wearing the wearable visualization device 12, the user may feel completely encompassed by the surreal environment 26 and may perceive the surreal environment 26 to be the real-world environment 22 that includes certain virtual features 24. In some embodiments, the wearable visualization device 12 may include features, such as light projection features, configured to project light into one or both eyes of the user so that certain virtual features 24 are superimposed over real-world objects viewable by the user. Such a wearable visualization device 12 may be considered to include a retinal display.

As such, it should be appreciated that the surreal environment 26 may include an AR experience, a VR experience, a mixed reality experience, a computer-mediated reality experience, a combination thereof, or other similar surreal environment. Moreover, it should be understood that the wearable visualization device 12 may be used alone or in combination with other features to create the surreal environment 26. Indeed, as discussed below, the user may wear the wearable visualization device 12 throughout a duration of a ride attraction in the amusement park or during another time, such as during a game, throughout a particular area or attraction of the amusement park, during a ride to a hotel associated with the amusement park, at the hotel, and so forth. In some embodiments, the wearable visualization device 12 may be physically coupled to (e.g., tethered via a cable 32) to a structure (e.g., the ride vehicle) to block separation of the wearable visualization device 12 from the structure and/or may be electronically coupled to (e.g., via the cable 32) to a computing system to facilitate operation of the wearable visualization device 12 (e.g., to display the virtual features 24; to monitor whether the wearable visualization device 12 has been improperly handled and provide related notifications).

As shown, the wearable visualization device 12 is removably coupleable (e.g., toollessly coupleable; coupleable without tools; coupled without threaded fasteners, such as bolts; separable without tools and without breaking the components of the wearable visualization device 12 or the guest interface device 14) to the guest interface device 14 to enable the wearable visualization device 12 to quickly transition between an engaged configuration 34, in which the wearable visualization device 12 is coupled to the guest interface device 14, and a disengaged configuration 36 (see, e.g., FIG. 2), in which the wearable visualization device 12 is decoupled from the guest interface device 14. In the illustrated embodiment, the guest interface device 14 is configured to be affixed to the user's head and, thus, enable the user to comfortably wear the wearable visualization device 12 throughout various attractions or while traversing certain amusement park environments. For example, the guest interface device 14 may include a head strap assembly 38 that is configured to span about a circumference of the user's head and configured to be tightened (e.g., constricted) on the user's head. In this manner, the head strap assembly 38 facilitates affixing the guest interface device 14 to the head of the user, such that the guest interface device 14 may be utilized to retain the wearable visualization device 12 on the user (e.g., when the wearable visualization device 12 is in the engaged configuration 34).

Such a configuration may enable the user or another person (e.g., an operator, a maintenance technician) to efficiently couple and decouple the wearable visualization device 12 to the guest interface device 14 (e.g., upon a determination that the wearable visualization device 12 should be serviced, such as due to being improperly handled). However, it should be appreciated that the wearable visualization device 12 and/or the guest interface device 14 may have any of a variety of forms or structures that enable the wearable visualization device 12 to function in the manner described herein. For example, the wearable visualization device 12 may be used without the separate guest interface device 14 and/or the wearable visualization device 12 may be integrally formed with the guest interface device 14. As shown, the wearable visualization device 12 may include a sensor 40 (e.g., IMU) and/or one or more lights 42 (e.g., LEDs). As discussed in more detail below, the sensor 40 may be configured to monitor one or more parameters (e.g., accelerations and/or decelerations) indicative of the wearable visualization device 12 being improperly handled and the lights 42 may be configured to illuminate, such as in response to a determination (e.g., by a controller) that the wearable visualization device 12 has been improperly handled. In this way, the wearable visualization device 12 may be identified as being potentially damaged and may be flagged for maintenance operations, even if the wearable visualization device 12 does not appear to be damaged (e.g., upon visual inspection).

Figure 2:
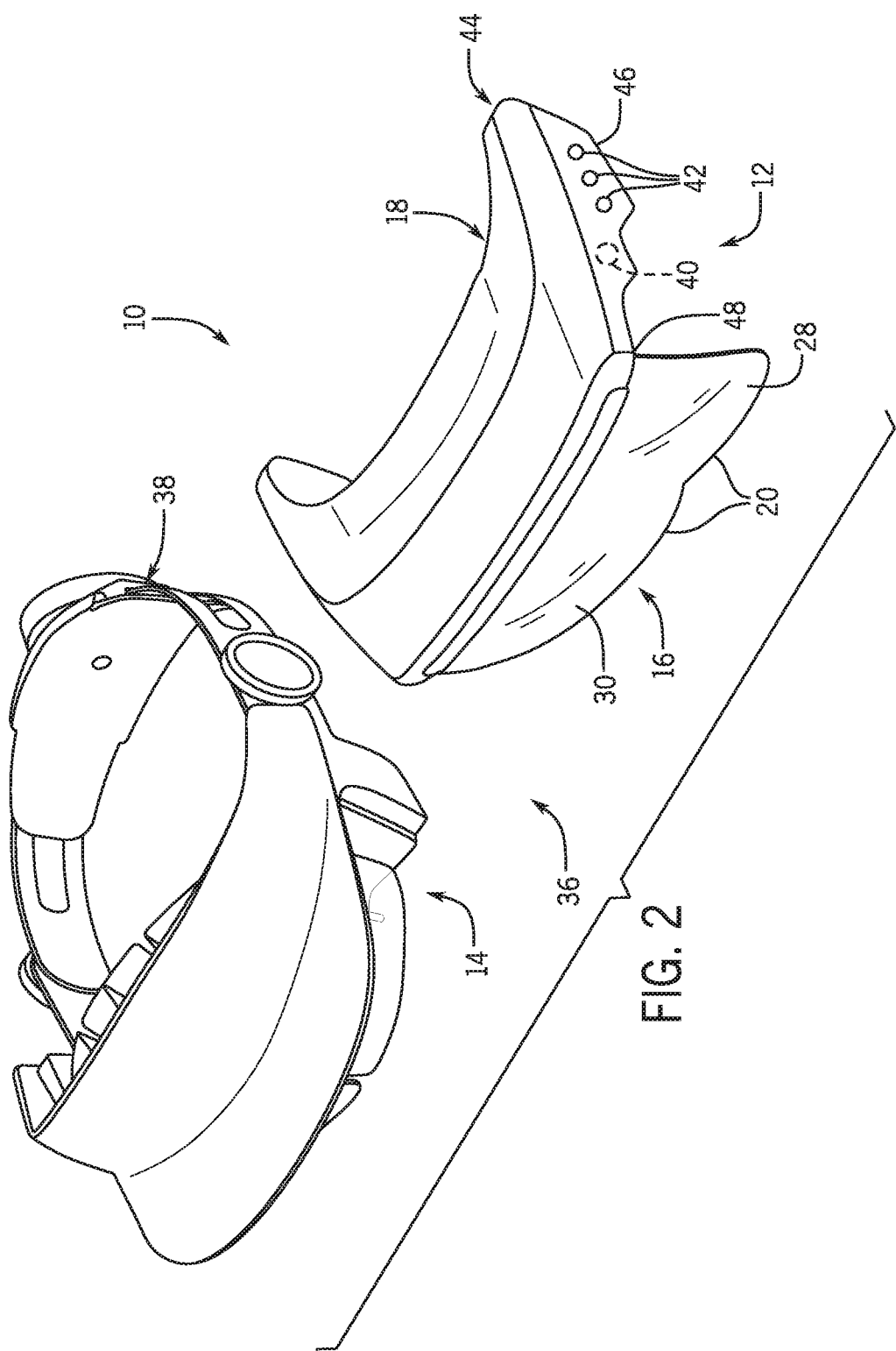
FIG. 2 is a perspective view of the wearable visualization device and the interface device of FIG. 1 in a detached configuration, in accordance with present embodiments.

FIG. 2 is a perspective view of an embodiment of the AR/VR system 10 illustrating the wearable visualization device 12 and the guest interface device 14 in the detached configuration 36. In some embodiments, the housing 18 may be assembled from multiple panels (e.g., housing sections; molded and/or machined panels), such as a lid 44, a chassis 46, and a lens mount 48 (e.g., a panel configured to support the lens portion 16), which may collectively form the housing 18. As discussed below, some of or all of the panels may include component mating features (e.g., machined and/or molded features on surfaces of the panels) that are configured to receive and/or couple to various sub-components (e.g., the sensor 40; the lights 42; other electronic components, such as a controller) of the wearable visualization device 12.

As discussed below, after installation of the sub-components on one or more of the panels, the panels may be assembled (e.g., coupled to one another via fasteners, adhesives, and/or other techniques) to form the housing 18. The housing 18 may therefore support the sub-components and/or encapsulate the sub-components to substantially seal (e.g., hermetically seal) at least a portion of the sub-components within the housing 18 to shield these sub-components from direct exposure to ambient environmental elements (e.g., moisture) surrounding the wearable visualization device 12. It be understood that, in other embodiments, the housing 18 may be assembled from additional or fewer panels than the lid 44, the chassis 46, and the lens mount 48. Indeed, in certain embodiments, the housing 18 may include 1, 2, 3, 4, 5, 6, or more than six individual panels that, in an assembled configuration, may collectively form the housing 18.

It should also be understood that the sensor 40 may be positioned at any location of the wearable visualization device 12 and/or that any number (e.g., 1, 2, 3, 4, or more) of sensors 40 may be provided. As a non-limiting example, the sensor 40 may be a position and/or impact sensor, such as an accelerometer, magnetometer, gyroscope, global positioning system receiver, motion tracking sensor, electromagnetic and solid-state motion tracking sensor, and/or IMU. When the sensor 40 is an IMU, the IMU may include a nine degree of freedom system on a chip equipped with accelerometers, gyroscopes, a magnetometer, and a processor for executing sensor fusion algorithms. As such, the signals from the IMU may be used to determine an acceleration and/or an orientation of the wearable visualization device 12 (e.g., relative to a gravity vector). The wearable visualization device 12 may include different types of sensors 40, such as different types of sensors 40 that detect different parameters (e.g., an IMU that detects acceleration of the wearable visualization device 12 and one or more impact sensors that detect a location of impact on the wearable visualization device 12).

Similarly, the lights 42 may be positioned at any location of the wearable visualization device 12 and/or any number (e.g., 1, 2, 3, 4, or more) of lights 42 may be provided. The lights 42 may be positioned to be visible while the wearable visualization device 12 is coupled to the guest interface device 14, visible while the wearable visualization device 12 is docked (e.g., coupled to or stored on a structure, such as a ride vehicle), visible to the user while the user is wearing the wearable visualization device 12, and/or visible to an operator (e.g., a person other than the user) to facilitate visualization of the lights 42 while the lights 42 are illuminated.

Figure 3:
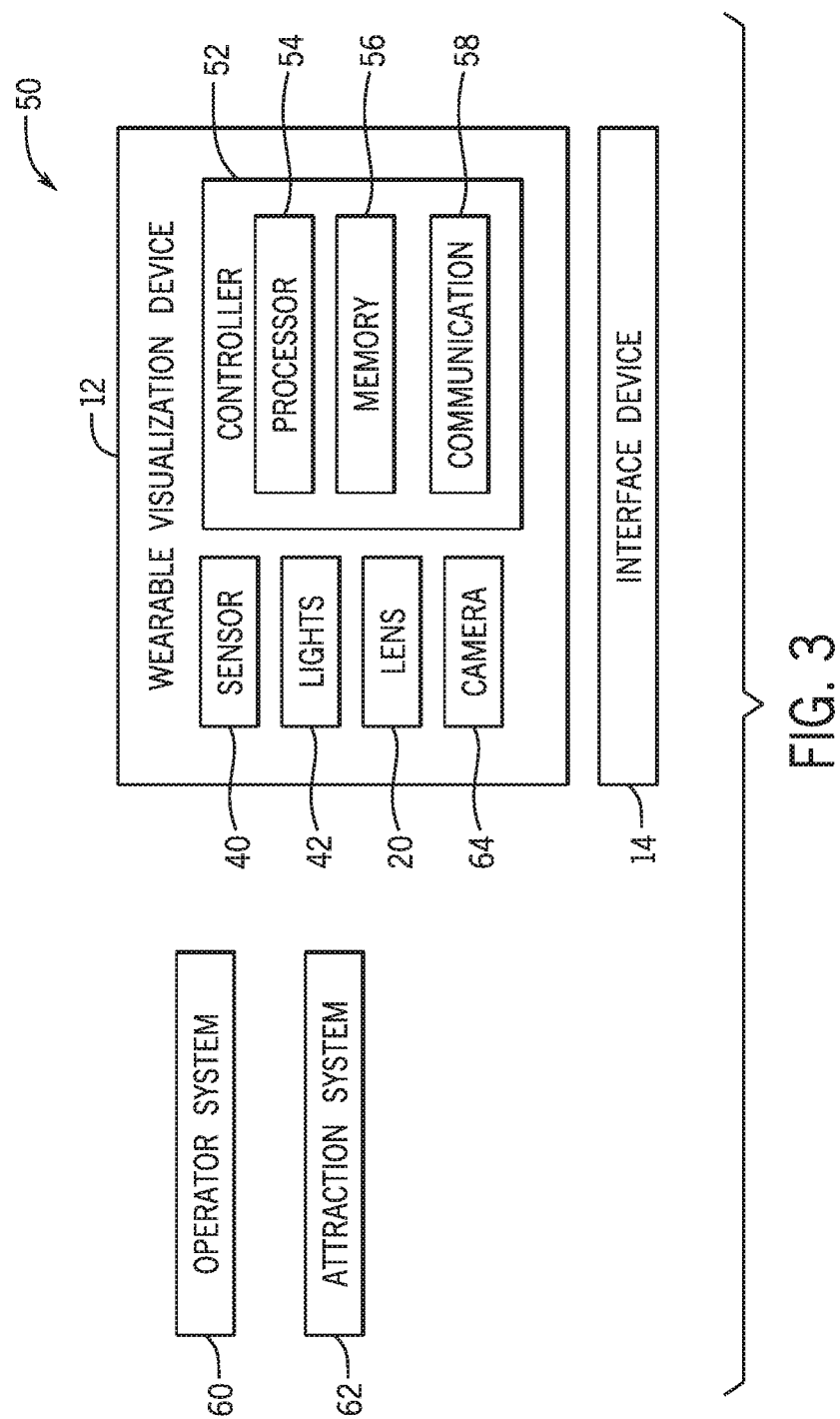
FIG. 3 is a schematic diagram of components of a detection system for the wearable visualization device of FIG. 1, in accordance with present embodiments.

FIG. 3 is a schematic diagram of components of a detection system 50 (e.g., drop detection system) for the wearable visualization device 12. As shown, the detection system 50 may include the sensor 40 and the lights 42 of the wearable visualization device 12. The detection system 50 may also include a controller 52 having a processor 54 and a memory device 56. As shown, the controller 52 is located on the wearable visualization device 12; however, it should be understood that the controller 52 may be located off of the wearable visualization device 12, such as on a ride vehicle or on a system located remotely from the wearable visualization device 12. Furthermore, the functions and processing steps described herein as being carried out by the controller 52 may be divided between the controller 52 and any other suitable controller or processing system (e.g., of the sensor 40, a ride vehicle, a system located remotely from the wearable visualization device 12; the controller 52 may be or may be part of a distributed control system having multiple processors). For example, the sensor 40 may be an IMU having a first processor that is configured to count a number of accelerations over an acceleration threshold, and the sensor 40 may provide the number to a second processor for further processing and/or to enable the second processor to carry out certain actions, such as illuminating the lights 42. Thus, the processor 54 may include one or more processors located in any suitable location and the memory device 56 may include one or more memory devices located in any suitable location.

The memory device 56 may include one or more tangible, non-transitory, computer-readable media that store instructions executable by the processor 54 and/or data (e.g., parameters; a number of events) to be processed by the processor 54. For example, the memory device 56 may include random access memory (RAM), read only memory (ROM), rewritable non-volatile memory such as flash memory, hard drives, optical discs, and/or the like. Additionally, the processor 54 may include one or more general purpose microprocessors, one or more application specific processors (ASICs), one or more field programmable gate arrays (FPGAs), or any combination thereof. Further, the memory device 56 may store instructions executable by the processor 54 to perform the methods and control actions described herein. The controller 52 may also include a communication device 58 that enables communication with other devices or systems, such as an operator system 60 (e.g., having a computing system with a processor and a memory device) and/or an attraction system 62 (e.g., having a computing system with a processor and a memory device), via a communication network.

The sensor 40 may be configured to detect the one or more parameters indicative of the wearable visualization device 12 being improperly handled. For example, if the user drops the wearable visualization device 12 (e.g., in free fall toward the ground/along a gravity vector), the sensor 40 may detect an acceleration (e.g., a sudden acceleration or deceleration). The sensor 40 may provide signals to the processor 54, which may process the signals by comparing the acceleration (e.g., maximum acceleration value) to an acceleration threshold (e.g., acceleration threshold value). The processor 54 may be configured to determine that the wearable visualization device 12 has been dropped in response to determining that the acceleration exceeds the acceleration threshold. It should be appreciated that the acceleration are broad terms that encompass various ways of detecting dropping and/or throwing, and thus, the acceleration may be negative and the acceleration threshold may be a negative acceleration threshold (e.g., due to falling) or the acceleration threshold may be considered to be a deceleration threshold (e.g., due to a sudden stop due to an impact). The processor 54 may also be considered to determine and analyze the acceleration and/or other parameters over time (e.g., acceleration pattern or signature) to determine whether the wearable visualization device 12 has been improperly handled (e.g., and to characterize the event, as discussed below).

The acceleration being over the acceleration threshold may generally indicate that a severity (e.g., severity level) of the drop exceeds a severity threshold (e.g., the motion of the wearable visualization device 12 is enough to be considered a drop, which may be potentially damaging to the wearable visualization device 12). Thus, the acceleration threshold may represent the severity threshold. In some embodiments, the processor 54 may compare the acceleration to multiple acceleration thresholds, which may each represent a different severity threshold and may enable the processor to more precisely determine the severity of the drop. For example, if the acceleration is above a first acceleration threshold and below a second acceleration threshold, the processor 54 may determine that the drop occurred and has a first, lower severity level. And if the acceleration is above both the first and the second acceleration thresholds, the processor 54 may determine that the drop occurred and has a second, higher severity level. The processor 54 may be configured to determine that the wearable visualization device 12 has been thrown and determine a severity of the throw in a similar manner (e.g., comparison to one or more acceleration thresholds). It should be appreciated that the sensor 40 may additionally or alternatively detect various other parameters, such as deceleration, an angular rate, and/or an orientation of the wearable visualization device 12 (e.g., relative to the gravity vector). The processor 54 may process signals from the sensor 40 in a similar manner (e.g., comparison to one or more thresholds) to determine whether the wearable visualization device 12 has been dropped or otherwise improperly handled, as well as the associated severity level.

In some embodiments, regardless of the parameters and regardless of the number of parameters, the processor 54 may process the signals from the sensor 40 to determine characteristics of the motion of the wearable visualization device 12 (e.g., to characterize the event and/or the improper handling, such as to characterize the event as a drop or a throw). For example, the processor 54 may determine that the signals indicate that the wearable visualization device 12 was dropped, a velocity of the wearable visualization device 12 during the drop, a time and/or a distance traveled during the drop, that the wearable visualization device 12 was thrown, a velocity at which the wearable visualization device 12 was thrown, a time and/or a distance of the throw, a location of impact, or the like. The drop may generally have a lower acceleration than the throw, as well as other parameters that are different than the throw. Thus, the processor 54 may characterize the event as a drop or a throw based on comparison of the parameter(s) to known parameters (e.g., stored in the memory device 56) that correlate to a drop or a throw.

As noted above, in some embodiments, the processor 54 may be configured to compare the parameter(s) and/or the characteristic(s) to respective thresholds (e.g., one or more acceleration thresholds, one or more velocity thresholds, one or more time thresholds, one or more distance thresholds) to determine the severity of the event and/or the improper handling. For example, a short drop with a lower acceleration may be less severe than a high-speed throw with a higher acceleration. In some cases, the processor 54 may be configured to input the parameter(s) and/or the characteristic(s) into a model that is configured to output the severity or to otherwise classify (e.g., categorize) the event and/or the improper handling based on the parameter(s) and/or the characteristic(s). For example, the model may account for certain combinations of parameters that have historically resulted in damage or impaired the operation of similar wearable visualization devices 12. In some embodiments, the processor 54 may account for the location of the impact (e.g., based on signals from impact sensors) to determine the severity, as an impact at the lenses 20 may be more severe and may be more likely to cause damage than an impact at the housing 18 (FIG. 1). The processor 54 may also be configured to determine a motion of the wearable visualization device 12 relative to a ride vehicle (e.g., to isolate the motion of the wearable visualization device 12 from the motion of the ride vehicle, such as from expected or known motions or accelerations of the ride vehicle during a course of a ride and/or from motions or accelerations of the ride vehicle during a course of the ride as detected by a ride vehicle sensor configured to monitor the motions of the ride vehicle). In this way, a sudden motion or acceleration of the ride vehicle (e.g., at a portion of the ride that is designed to move the ride vehicle in this manner) may be ignored or not counted as improper handling by the processor 54.

In response to determining that the wearable visualization device 12 been dropped or otherwise improperly handled (e.g., with a severity that exceeds the severity threshold), the processor 54 may then cause one or more actions, such as illumination of at least one of the lights 42. The illumination of at least one of the lights 42 may prompt the user or the operator to carry out a maintenance operation, such as to inspect the wearable visualization device 12, to carry out a test of the wearable visualization device 12, to separate the wearable visualization device 12 from the guest interface device 14, to separate the wearable visualization device 12 from any structure (e.g., the ride vehicle), to replace the wearable visualization device 12, and/or to send the wearable visualization device 12 to a maintenance technician for repair. In some cases, the controller 52 may instruct the light 42 to illuminate with a particular color based on the parameters, the characteristics, and/or the severity of the event. For example, the short drop with the lower acceleration may result in the light 42 illuminating with a yellow color, while the high-speed throw with the higher acceleration may result in the light 42 illuminating with a red color. Any number of colors may be utilized to convey various types of events (e.g., yellow indicates a drop; red indicates a throw) and/or severity (e.g., yellow indicates an acceleration below a first acceleration threshold; red indicates an acceleration over the first acceleration threshold). In some embodiments, the light 42 may be capable of illuminating with different colors and/or multiple different lights may be provided.

In some embodiments, the processor 54 may be configured to count a number of events (e.g., a number of events in which the wearable visualization device 12 has been improperly handled) over time. For example, once a certain number of drops or throws (e.g., each with an acceleration over the acceleration threshold; each with a severity over the severity threshold) is reached, the processor 54 may instruct at least one of the lights 42 to illuminate. In some cases, the processor 54 may instruct one light 42 to illuminate for each event. For example, the wearable visualization device 12 may include five lights, a first light may illuminate upon a first drop of the wearable visualization device 12, a second light may illuminate upon a second drop of the wearable visualization device 12, a third light may illuminate upon a throw of the wearable visualization device 12, and so forth. In some embodiments, the processor 54 may instruct one or more lights 42 to illuminate for each event, and the number of lights 42 may be based on the severity of each event. For example, the wearable visualization device 12 may include five lights, a first light may illuminate upon a first short drop of the wearable visualization device 12, a second light and a third light may illuminate upon a high-speed throw of the wearable visualization device 12, and so forth. Then, when a certain number (e.g., all) of the lights 42 of the wearable visualization device 12 are illuminated, the operator may be notified to taken the action (e.g., by viewing the lights 42). In some embodiments, the wearable visualization device 12 may include a speaker, and the one or more actions may include providing an audible output via the speaker.

In addition to or as an alternative to the illumination of the at least one light 42, the processor 54 may take one or more other actions, such as sending a notification to the operator system 60 and/or the attraction system 62. Various actions (e.g., automated actions) are envisioned. For example, upon determination that an event has occurred (e.g., an event having a severity over a severity threshold; a certain number of such events has occurred), the processor 54 may turn off the wearable visualization device 12 or at least certain features of the wearable visualization device 12 (e.g., turn off the lenses 20; block display of virtual features on the lenses 20). In some embodiments, the processor 54 may block display of virtual features on the lenses 20 in response to determining that the event had a first, higher severity (e.g., a high-speed throw; a first, higher acceleration), but the processor 54 may continue to enable display of virtual features on the lenses 20 in response to determining that the event had a second, lower severity (e.g., a short drop; a second, lower acceleration).

In some embodiments, the wearable visualization device 12 may be coupled (e.g., removably coupled; temporarily locked) to the guest interface device 14 and/or to a structure, such as a ride vehicle. For example, the wearable visualization device 12 may be locked to the guest interface device 14 via an electromagnetic system. In such cases, in response to determining that the event has occurred, the power to the electromagnetic system may be blocked (e.g., the electromagnets may be deactivated), thereby enabling separation of the wearable visualization device 12 from the guest interface device 14. In some such cases, the power to the electromagnetic system may be blocked only while the ride vehicle is in a loading/unloading zone and/or while the ride vehicle is stationary. Similarly, a locking device that couples the wearable visualization device 12 to the ride vehicle may be unlocked in response to determining that the event has occurred and/or while the ride vehicle is in the loading/unloading zone and/or while the ride vehicle is stationary. The wearable visualization device 12 may then be coupled to the guest interface device 14 and/or to the structure only via mechanical connections (e.g., hooks, key/slot interfaces) that can be quickly, manually disconnected. Such techniques may enable the wearable visualization device 12 that has experienced the event to be quickly removed for maintenance operations and replaced with another wearable visualization device 12 without slowing down the throughput (e.g., unloading and loading of the users) at the attraction, for example. As another example, the processor 54 may be configured to initiate (e.g., run) a test (e.g., health test) in response to determining that the event has occurred. The test may include displaying an image (e.g., pattern, line) on the lenses 20 of the wearable visualization device 12, and using a camera 64 of the wearable visualization device 12 to determine that the image is displayed correctly on the lenses 20. The processor 54 may receive an image from the camera 64 and may process the image (e.g., via template or pattern matching) to determine whether the wearable visualization device 12 is functioning properly after the event. The test may include providing information (e.g., a question and/or an image) on the lenses 20 for visualization by the user, and then receiving a gesture input from the user (e.g., a nod of the head of the user) that is detected by the sensor 40, as discussed in more detail below with respect to FIG. 6.

In some embodiments, the processor 54 may be configured to send (e.g., via the communication device 58) an indication to the operator system 60, which may be remotely located from the wearable visualization device 12 (e.g., a tablet held by an operator of the attraction, a computer accessed by an operator overseeing operations of the amusement park). The indication may include a text message or other notification (e.g., illumination of a light) that the wearable visualization device 12 has been improperly handled. The indication may further include data related to the parameters, characteristics, and/or the severity of the event.

It should be appreciated that data related to a number of events, as well as data related to the parameters, characteristics, and/or the severity of each event, may be used to generate an event report (e.g., table) for each wearable visualization device 12 and/or may enable an operator of the amusement park to keep track of a reliability and/or durability of the wearable visualization devices 12. For example, if the wearable visualization devices 12 used in the attraction generally experience impaired functionality after only a few minor drops, the operator may be able to focus efforts on improving the reliability and/or durability even in the presence of drops and/or taking steps to reduce drops. If the wearable visualization devices 12 experience multiple severe drops and/or throws, the operator may be able to focus efforts on taking steps to reduce drops and/or throws. Furthermore, if the wearable visualization devices 12 experience impaired functionality without any drops, the operator may be able to focus efforts on improving other features of the wearable visualization devices 12 and/or seek replacement under a warranty.

In some embodiments, the processor 54 may be configured to send (e.g., via the communication device 58) an indication to the attraction system 62 to cause the attraction system 62 to illuminate lights (e.g., on a ride vehicle) and/or to adjust operation of features of the attraction, such as to adjust a path or a movement of a ride vehicle. For example, in response to a determination that the event has occurred, the attraction system 62 may divert the ride vehicle (e.g., to a maintenance bay and/or loading/unloading zone) to facilitate maintenance operations. The diversion may occur during the ride, so as to avoid the user experiencing the ride with a potentially malfunctioning wearable visualization device 12. Thus, the user or an operator may inspect, repair, and/or replace the wearable visualization device 12 and/or the user may unload from the ride vehicle and reload into another ride vehicle with a properly functioning wearable visualization device 12 so that the user can enjoy the AR/VR experience throughout the remainder of the ride. The diversion may occur after the ride to enable the wearable visualization device 12 to be inspected, repaired, and/or replaced between ride cycles and/or between users to avoid the users experiencing the ride with a potentially malfunctioning wearable visualization device 12. The diversion may include blocking forward movement of the ride vehicle out of the loading/unloading zone until the wearable visualization device 12 is inspected or otherwise addressed. In some embodiments, in response to a determination that the event has occurred, the attraction system 62 may be configured to enhance physical features, such as displays, animatronics, light shows, or the like, on the ride vehicle and/or within the attraction (e.g., so that the user is able to view text or images, such as on the displays, and to generally enjoy the attraction even without a properly functioning wearable visualization device 12).

Figure 4:
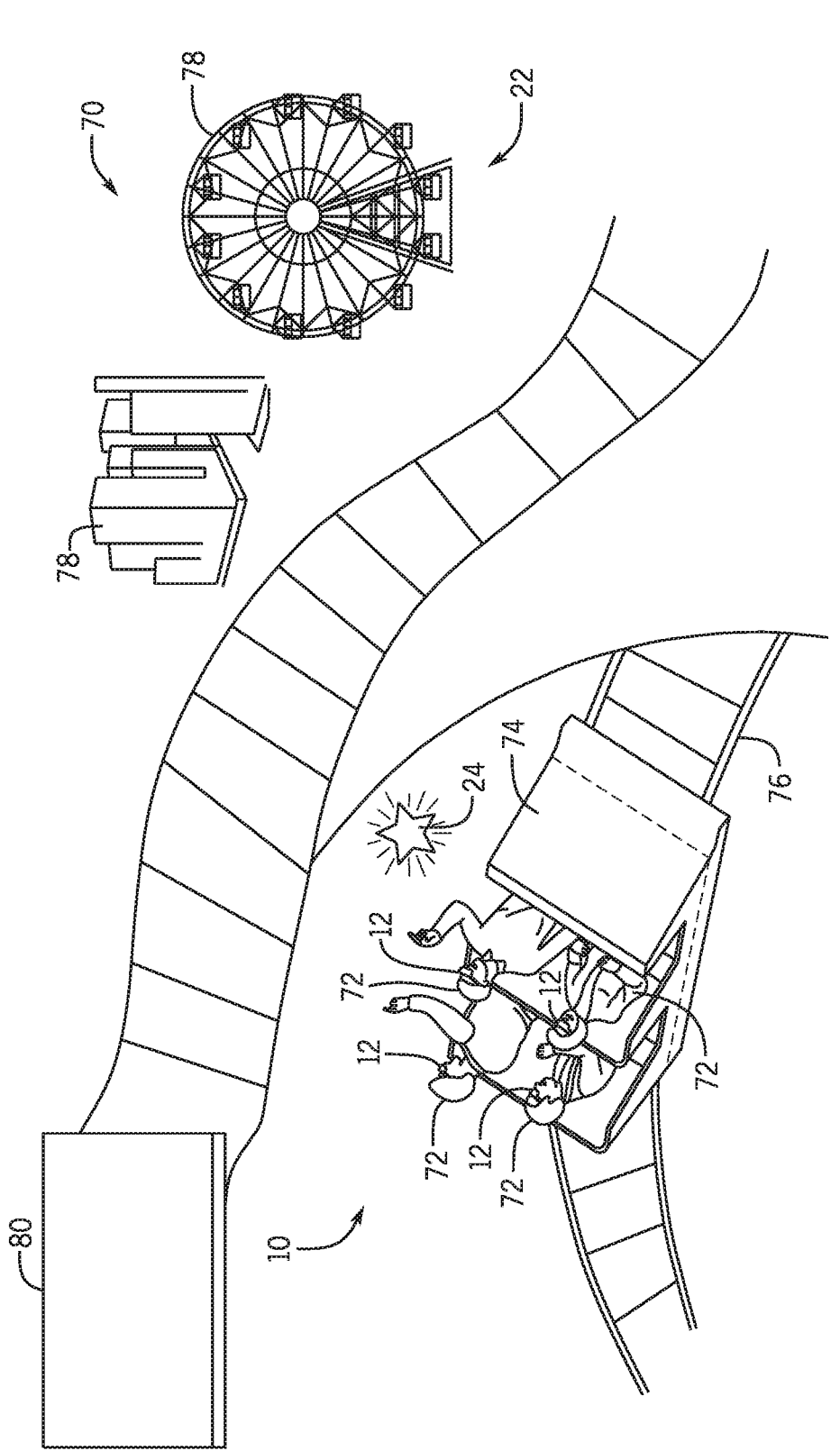
FIG. 4 is a perspective view a portion of a ride attraction in which the AR/VR system of FIG. 1 may be utilized, in accordance with present embodiments.

FIG. 4 is a perspective view of an attraction 70 in which the AR/VR system 10 may be employed. As shown, users 72 are positioned within a ride vehicle 74 that travels along a path 76. At least at certain times of the ride, the users 72 may be able to view physical structures 78 in the real-world environment 22 through the lenses of the wearable visualization device 12. At least at certain times of the ride, the users 72 may be able to view virtual features 24 on the lenses of the wearable visualization device 12. As represented in FIG. 4, the virtual features 24 may be overlaid onto the real-world environment 22 so that the users are able to view both the physical structures 78 in the real-world environment 22 and the virtual features 24 simultaneously. Each user 72 may be presented with different virtual features 24 so that each user 72 has a different experience on the ride. The users 72 may board the ride vehicle 74 in a loading zone and exit from the ride vehicle 74 in an unloading zone (e.g., a loading/unloading zone 80). However, in the excitement of the ride, it is possible that the user 72 may drop the wearable visualization device 12 or that the wearable visualization device 12 may otherwise fall off of the user 72. It is also possible that the user 72 may throw the wearable visualization device 12 and/or that the wearable visualization device 12 may otherwise be improperly handled.

With reference to FIGS. 3 and 4, each wearable visualization device 12 may include components that are part of the detection system 50, which may monitor whether the wearable visualization device 12 is improperly handled during the ride. In some embodiments, during the ride, the detection system 50 may illuminate at least one light 42, provide a notification to the operator system 60, and/or cause an action to be taken by the attraction system 62. Additionally or alternatively, the detection system 50 may count or log the event within the memory device 56. Additionally or alternatively, the detection system 50 may illuminate at least one light 42, provide a notification to the operator system 60, and/or cause an action to be taken by the attraction system 62 only after the conclusion of the ride (e.g., in the loading/unloading zone 80) so as to not interrupt the ride.

In some embodiments, the processor 54 may count a total number of events and/or may periodically cause one or more actions based on the event(s), such as after a time period (e.g., hourly, daily, weekly), each time the wearable visualization device 12 is coupled to or uncoupled from the guest interface device 14, each time the wearable visualization device 12 is docked to the structure (e.g., to the ride vehicle 74, which may be detected via a position sensor), each time the ride vehicle 74 is in the loading/unloading zone 80 (e.g., after each ride cycle), and/or in response to a request by the user or other person (e.g., operator, maintenance technician). While FIG. 4 illustrates the attraction 70 with the ride vehicle 74, it should be appreciated that the attraction 70 may not include the ride vehicle 74. Instead, the attraction 70 may include a path over which the user 72 walks while wearing the wearable visualization device 12, a theatre in which the user 72 sits or stands while wearing the wearable visualization device 12, or any other suitable type of attraction. Furthermore, the attraction 70 may be configured such that the user 72 wears and/or carries the wearable visualization device 12 outside of the ride vehicle 74, such as while in line to board the ride vehicle 74, after unloading from the ride vehicle 74, or the like. Thus, it may be possible for the user 72 or another person (e.g., an operator, a maintenance technician) to drop the wearable visualization device 12 at other locations relative to the ride vehicle 74 and/or at other times outside of the ride. The detection system 50 may be configured to detect the events, to count the events, and/or to cause the one or more actions disclosed herein while the wearable visualization device 12 is at the other locations relative to the ride vehicle 74 and/or at the other times outside of the ride.

Figure 5:
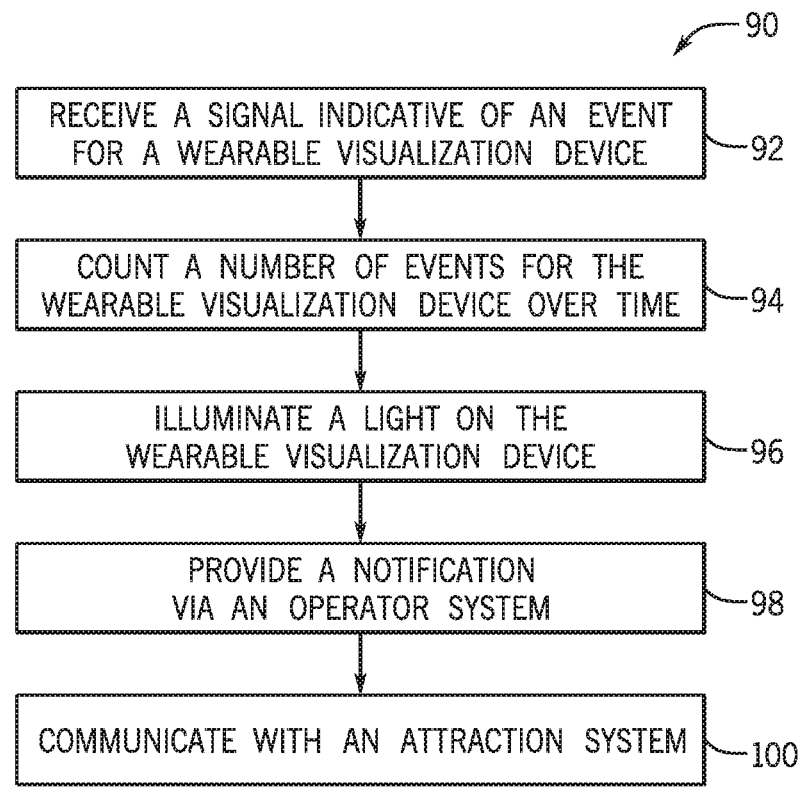
FIG. 5 is a method of using the AR/VR system of FIG. 1, in accordance with present embodiments.

FIG. 5 is a method 90 of using the detection system 50 to monitor an event (e.g., improper handling) of the wearable visualization device 12. The method 90 disclosed herein includes various steps represented by blocks. It should be noted that at least some steps of the method 90 may be performed as an automated procedure by a system, such as any of the detection system 50 disclosed herein. Although the flow chart illustrates the steps in a certain sequence, it should be understood that the steps may be performed in any suitable order and certain steps may be carried out simultaneously, where appropriate. Additionally, steps may be added to or omitted from the method 90.

As shown, in step 92, the method 90 may begin by receiving (e.g., from the sensor 40, at the processor 54) a signal indicative of an event for the wearable visualization device 12. As discussed above, the processor 54 may be configured to receive and to process the signal to determine that the event has occurred and/or to characterize the event (e.g., a type, a time, a distance, a velocity, a severity, a location of impact). In step 94, the processor 54 may count a number of events over time. The data related to the parameters, characteristics, severity, and/or the number of events may be stored in the memory device 56, for example.

In step 96, the processor 54 may instruct at least one light 42 on the wearable visualization device 12 to illuminate. For example, the processor 54 may instruct the at least one light 42 to illuminate in response to detection of a drop with a severity over a severity threshold and/or in response to detection of a number of drops over a count threshold. In step 98, the processor 54 may provide a notification to the operator system 60, which may be remotely located from the wearable visualization device 12. In step 100, the processor 54 may communicate with the attraction system 62, which may cause the attraction system 62 to adjust a feature of an attraction, such as to illuminate a light on a ride vehicle, to adjust a path of the ride vehicle, or the like.

Figure 6:
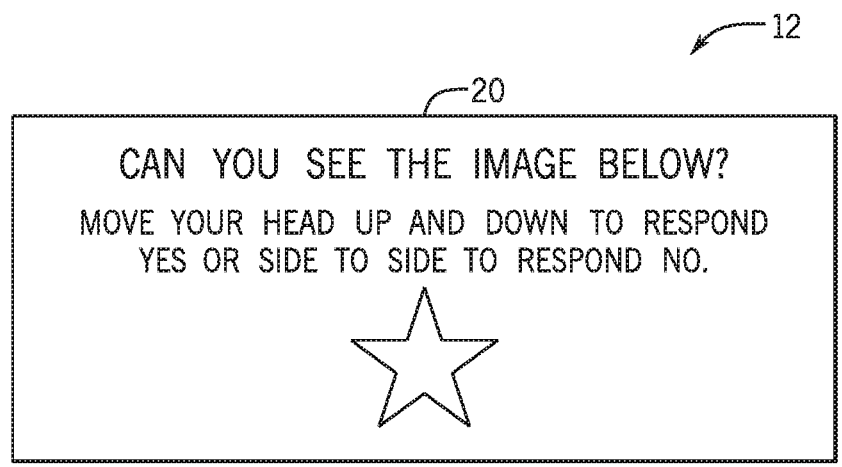
FIG. 6 is a schematic diagram of a question that may be presented via the wearable visualization device of FIG. 1, wherein the wearable visualization device enables a user to respond to the question with a gesture input, in accordance with present embodiments.

The sensor 40 of the wearable visualization device 12 may enable the user to provide gesture inputs. With this in mind, FIG. 6 is a schematic diagram of a question that may be presented on the lenses 20 of the wearable visualization device 12. For example, the question may be "Can you see the image below?" and the image may be a geometric shape or other image. The user may shake their head up and down to answer "yes," and the user may shake their head side to side to answer "no."

With reference to both FIGS. 3 and 6, while the wearable visualization device 12 is worn by the user, the sensor 40 may be able to detect the motion of the head of the user. The sensor 40 may provide signals indicative of the motion to the processor 54, which may determine the response or the answer from the user based on the signal. In this case, the processor 54 may characterize the response based on comparison of the parameter(s) to known parameters (e.g., stored in the memory device 56) that correlate to a "yes" or a "no" motion. The illustrated example may be used as part of a test to test whether the wearable visualization device 12 is functioning, such as after being improperly handled. The test may be initiated automatically by the processor 54 in response to the determination that the wearable visualization device has been improperly handled. For example, if the user responds "yes," then the processor 54 may determine that the wearable visualization device 12 is functioning after being improperly handled. However, if the user responds "no," then the processor 54 may determine that the wearable visualization device 12 is not functioning properly after being improperly handled. In such cases, the processor 54 may take one or more actions, including the one or more actions disclosed herein (e.g., illuminating the lights 42; notifying the operator system 60 and/or the attraction system 62). It should be appreciated that the test may be initiated in response to an input (e.g., by the user or operator), or that the test may be initiated at any other time (e.g., in response to coupling the wearable visualization device 12 to the guest interface device 14), prior to leaving the loading zone of the ride, or the like.

The gesture inputs may be used to provide various responses to various questions or other prompts, the gesture inputs may be used as part of a game, and/or the gesture inputs may be used to control other aspects of the wearable visualization device 12 and/or the attraction. Indeed, different motions of the head of the user may correspond to different responses or inputs. For example, moving the head of the user one way may be one input (e.g., to brighten the images on the lenses 20, to cause display of one image as part of a game, to adjust motion of a ride vehicle in one way), and moving the head of the user another way may be another input (e.g., to dim images on the lenses 20, to cause display of another image as part of a game, to adjust motion of the ride vehicle in another way).

The gesture inputs may also be used to enable the operator and/or the maintenance technician to unlock certain features of the wearable visualization device 12 (e.g., by moving the wearable visualization device 12 in a certain way and/or in certain patterns of movements). The gesture inputs may enable the operator and/or the maintenance technician to interact with the wearable visualization device 12 and/or the attraction (e.g., game) in order to diagnose problems and/or to see information that is not available to guests. The gesture inputs may enable the operator and/or the maintenance technician to access a menu (e.g., visible on the lenses 20 of the wearable visualization device 12; visible on a display connected to the wearable visualization device 12, such as a display on the ride vehicle), move through the menu, make selections on the menu, and/or carry out maintenance tests and/or steps using gesture inputs (e.g., only gesture inputs and motion of the wearable visualization device 12; without an auxiliary device, such as a mouse or a keyboard). In some cases, the gesture inputs may enable the operator and/or the maintenance technician to carry out maintenance and/or provide inputs to a computing system coupled to the wearable visualization device 12, such as a computing system of the ride vehicle (e.g., the attraction system 62 of FIG. 3), to thereby adjust operation of the computing system.

The sensor 40 of the wearable visualization device 12 may also enable other operations, such as head tracking of the head of the user. The sensor 40 (e.g., IMU) may be used to obtain data indicative of the way in which the head of the user is traveling through space. However, in certain settings the user may be positioned on a moving ride vehicle (e.g., translating and/or rotating relative to the ground). Accordingly, the AR/VR system 10 may include additional features and/or be configured to carry out processing steps to isolate the movement of the head of the user from the movement of the ride vehicle. For example, the AR/VR system 10 may use a solid state cabin tracking system and may secondarily use the sensor 40 (e.g., if needed) for additional input to a prediction algorithm (e.g., a Kalman filter).

The sensor 40 may also be utilized for off-board development (e.g., desktop development) because it provides a low-cost way of having head tracking in the wearable visualization device 10. Developers may utilize the basic tracking provided by the sensor 40 to look around a virtual scene; however, developers may not align the virtual scene to the real world in order to create the virtual scene. Thus, the developers may not utilize ride vehicle/cabin tracking systems, which may be more expensive, use a lot of equipment, and be time-consuming to set up as compared to the sensor 40, which may operate to obtain data indicative of the movement of the head of the user upon being plugged into a cable (e.g., USB cable; cable 32).

As set forth above, embodiments of the present disclosure may provide one or more technical effects useful for facilitating performance of maintenance activities on the wearable visualization device and for facilitating integration of the wearable visualization device in an amusement park. It should be understood that the technical effects and technical problems in the specification are examples and are not limiting. Indeed, it should be noted that the embodiments described in the specification may have other technical effects and can solve other technical problems.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A detection system configured to detect improper handling of a wearable visualization device, the detection system comprising:
    a sensor coupled to the wearable visualization device; and
    a processor configured to:
        receive a signal from the sensor, wherein the signal is indicative of a total acceleration of the wearable visualization device while the wearable visualization device is carried by a ride vehicle during a ride cycle;
        receive data indicative of an acceleration of the ride vehicle during the ride cycle;
        use the total acceleration of the wearable visualization device and the acceleration of the ride vehicle to isolate an individual acceleration of the wearable visualization device from the total acceleration of the wearable visualization device, wherein the individual acceleration of the wearable visualization device indicates acceleration of the wearable visualization device relative to the ride vehicle;
        determine that the signal indicates improper handling of the wearable visualization device in response to the individual acceleration of the wearable visualization device exceeding an acceleration threshold; and
        in response to determining that the signal indicates improper handling of the wearable visualization device,
            instruct an attraction system having the ride vehicle to adjust a path of movement of the ride vehicle during the ride cycle.

2. The detection system of claim 1, comprising a light emitter coupled to the wearable visualization device, wherein the processor is configured to determine a number of events of improper handling of the wearable visualization device over time, and to instruct illumination of the light emitter in response to determining that the number of events exceeds a count threshold.

3. The detection system of claim 1, wherein the processor is configured to determine a severity of the improper handling based on the signal.

4. The detection system of claim 3, comprising a light emitter coupled to the wearable visualization device, wherein the processor is configured to instruct illumination of the light emitter in a first color in response to determining that the severity is a first level and to instruct illumination of the light emitter in a second color in response to determining that the severity is a second level.

5. The detection system of claim 3, wherein the processor is configured to determine the severity by comparing a parameter of the signal to one or more parameter thresholds.

6. The detection system of claim 1, comprising the wearable visualization device, wherein the processor is configured to stop operation of at least one component of the wearable visualization device in response to determining that the signal indicates improper handling of the wearable visualization device, and wherein the at least one component comprises one or more lenses of the wearable visualization device configured to provide an augmented reality (AR), a virtual reality (VR), and/or mixed reality experience to a user.

7. The detection system of claim 1, wherein the processor is configured to determine a type of improper handling of the wearable visualization device based on the signal.

8. The detection system of claim 7, comprising a light emitter coupled to the wearable visualization device, wherein the processor is configured to instruct illumination of the light emitter in a first color in response to determining that the type correlates to the wearable visualization device being dropped and to instruct illumination of the light emitter in a second color in response to determining that the type correlates to the wearable visualization device being thrown.

9. The detection system of claim 1, wherein the processor is configured to provide a notification to a remote system that is located remotely from the wearable visualization device in response to determining that the signal indicates improper handling of the wearable visualization device.

10. The detection system of claim 9, wherein the remote system comprises the attraction system, and the notification is configured to cause the attraction system to adjust a feature of an attraction.

11. The detection system of claim 1, wherein the processor is configured to generate instructions to adjust operation of a light emitter on the ride vehicle in response to determining that the signal indicates improper handling of the wearable visualization device.

12. The detection system of claim 1, comprising a light emitter coupled to the wearable visualization device, wherein the processor is configured to instruct illumination of the light emitter in response to determining that the signal indicates improper handling of the wearable visualization device.

13. A wearable visualization device, comprising:
a housing configured to couple to a head of a user via an interface device;
one or more lenses coupled to the housing and configured to overlay augmented reality (AR), virtual reality (VR), and/or mixed reality features onto a line of sight of the user;
a sensor supported by the housing and configured to detect a motion of the wearable visualization device; and
a processor configured to receive a signal from the sensor, determine whether the signal indicates that the wearable visualization device has been dropped or thrown based on a detected motion of the wearable visualization device, and instruct an attraction system having a ride vehicle and the wearable visualization device to block movement of the ride vehicle out of a loading/unloading zone in response to determining that the signal indicates that the wearable visualization device has been dropped or thrown.

14. The wearable visualization device of claim 13, comprising a light emitter supported by the housing, wherein the processor is configured to determine a number of times that the wearable visualization device has been dropped or thrown over time, and to instruct illumination of the light emitter in response to determining that the number of times exceeds a count threshold.

15. The wearable visualization device of claim 13, comprising a light emitter supported by the housing, wherein the processor is configured to:
determine a severity of a drop or a throw of the wearable visualization device based on the signal; and
instruct illumination of the light emitter in a first color in response to determining that the severity is a first level and to instruct illumination of the light emitter in a second color in response to determining that the severity is a second level.

16. The wearable visualization device of claim 13, wherein the signal generated by the sensor is indicative of a total acceleration of the wearable visualization device while the wearable visualization device is carried by the ride vehicle during a ride cycle, and the processor is configured to:
receive data indicative of an acceleration of the ride vehicle during the ride cycle;
use the total acceleration of the wearable visualization device and the acceleration of the ride vehicle to isolate an individual acceleration of the wearable visualization device from the total acceleration of the wearable visualization device, wherein the individual acceleration of the wearable visualization device indicates acceleration of the wearable visualization device relative to the ride vehicle; and
determine that the signal indicates that the wearable visualization device has been dropped or thrown in response to the individual acceleration of the wearable visualization device exceeding an acceleration threshold.

17. The wearable visualization device of claim 13, comprising the interface device, wherein the interface device is configured to couple to the head of the user via a head strap assembly.

18. A method of using a detection system to detect improper handling of a wearable visualization device, the method comprising:
receiving, at a processor, a signal from a sensor coupled to the wearable visualization device, wherein the signal is indicative of a total acceleration of the wearable visualization device while the wearable visualization device is carried by a ride vehicle during a ride cycle;
determining, via the processor, an acceleration of the ride vehicle during the ride cycle based on a known acceleration profile of the ride vehicle, wherein the known acceleration profile includes data indicating an expected value of the acceleration of the ride vehicle repeated during sequential courses of the ride cycle between loading/unloading operations of the ride vehicle;
isolating, via the processor, an individual acceleration of the wearable visualization device from the total acceleration of the wearable visualization device using the total acceleration of the wearable visualization device and the acceleration of the ride vehicle, wherein the individual acceleration of the wearable visualization device indicates acceleration of the wearable visualization device relative to the ride vehicle;
determining, using the processor, that the signal indicates improper handling of the wearable visualization device in response to the individual acceleration of the wearable visualization device exceeding an acceleration threshold;
counting, using the processor, a number of events of improper handling of the wearable visualization device over time; and
instructing, using the processor, illumination of a light emitter in response to determining that the number of events exceeds a count threshold.

19. The method of claim 18, comprising stopping, via the processor, display of augmented reality (AR), virtual reality (VR), and/or mixed reality features on one or more lenses of the wearable visualization device in response to determining that the signal indicates improper handling of the wearable visualization device.

20. The method of claim 18, providing, via the processor, a notification to a remote system that is located remotely from the wearable visualization device in response to determining that the signal indicates improper handling of the wearable visualization device.

* * * * *